US012712179B2

(12) United States Patent
Chung et al.

(10) Patent No.: US 12,712,179 B2

(45) Date of Patent: Aug. 18, 2026

(54) ANODE ACTIVE MATERIAL FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Ju Ho Chung, Daejeon (KR); Gwi Ok Park, Daejeon (KR); Jae Young Choi, Daejeon (KR)

(73) Assignees: SK On Co., Ltd., Seoul (KR); SK Innovation Co., Ltd., Seoul (KR)

( * ) Notice: Subject to any disclaimer, the term of this patent is extended or adjusted under 35 U.S.C. 154(b) by 0 days.

(21) Appl. No.: 18/403,374

(22) Filed: Jan. 3, 2024

(65) Prior Publication Data

US 2024/0234701 A1 Jul. 11, 2024

(30) Foreign Application Priority Data

Jan. 3, 2023 (KR) ........................ 10-2023-0000870

(51) Int. Cl.
*H01M 4/36* (2006.01)
*C01B 33/12* (2006.01)
(Continued)

(52) U.S. Cl.
CPC ............. *H01M 4/366* (2013.01); *C01B 33/12* (2013.01); *H01M 4/133* (2013.01); *H01M 4/48* (2013.01);
(Continued)

(58) Field of Classification Search
CPC ......... H01M 4/386; H01M 4/48; H01M 4/366
See application file for complete search history.

(56) References Cited

U.S. PATENT DOCUMENTS

2013/0337325 A1 12/2013 Jung et al.
2014/0106231 A1 4/2014 Park et al.
(Continued)

FOREIGN PATENT DOCUMENTS

CN 114373915 A * 4/2022 ............ H01M 4/366
EP 4340067 A1 3/2024
(Continued)

OTHER PUBLICATIONS

CN114373915A Translation from Espacenet (Year: 2022).*
Extended European Search Report for European Patent Application No. 23214233.1, mailed Aug. 16, 2024 (8 pages).

*Primary Examiner* — Nathanael T Zemui
(74) *Attorney, Agent, or Firm* — Jones Day

(57) ABSTRACT

Anode active materials and secondary batteries including the anode active materials are disclosed. An anode active material for a secondary battery based on an embodiment of the present disclosure includes a silicon oxide particle. The silicon oxide particle has a core portion including silicon oxide and a surface portion formed on the core portion. An oxidation number ratio defined as $O_S/O_C$ of the silicon oxide particle is 1.7 or more, and less than 2.2. $O_S$ is an oxidation number of silicon oxide of the surface portion obtained by an X-ray photoelectron spectroscopy (XPS) analysis, and $O_C$ is an oxidation number of the silicon oxide of the core portion obtained by the XPS analysis.

18 Claims, 2 Drawing Sheets

(51) Int. Cl.
*H01M 4/02* (2006.01)
*H01M 4/133* (2010.01)
*H01M 4/48* (2010.01)
*H01M 4/587* (2010.01)
*H01M 10/052* (2010.01)

(52) U.S. Cl.
CPC ......... *H01M 4/587* (2013.01); *H01M 10/052* (2013.01); *C01P 2002/52* (2013.01); *C01P 2002/85* (2013.01); *C01P 2004/80* (2013.01); *C01P 2006/40* (2013.01); *H01M 2004/027* (2013.01)

(56) References Cited

U.S. PATENT DOCUMENTS

2020/0403235 A1* 12/2020 Lee ....................... H01M 4/366
2023/0155118 A1* 5/2023 Oh ....................... H01M 4/131

FOREIGN PATENT DOCUMENTS

| | | | |
|---|---|---|---|
| EP | 4358181 | A1 | 4/2024 |
| KR | 10-2014-0019747 | A | 2/2014 |
| KR | 10-2014-0070451 | A | 6/2014 |
| KR | 10-1591698 | B | 1/2016 |
| KR | 10-2017-0027934 | A | 3/2017 |
| WO | 2022/236985 | A1 | 11/2022 |
| WO | 2022/262096 | A1 | 12/2022 |

* cited by examiner

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This patent document claims the priority and benefits of Korean Patent Application No. 10-2023-0000870 filed in the Korean Intellectual Property Office (KIPO) on Jan. 3, 2023, the entire disclosure of which is incorporated herein by reference.

TECHNICAL FIELD

The present disclosure relates to an anode active material for a lithium secondary battery and a lithium secondary battery including an anode active material.

BACKGROUND

The rapid growth of electric vehicles and portable devices, such as camcorders, mobile phones, and laptop computers, has brought increasing demands for secondary batteries which can be charged and discharged repeatedly. Battery packs that include secondary batteries are being developed and applied as a power source for an eco-friendly vehicle such as an electric vehicle.

Examples of the secondary batteries may include lithium secondary batteries, nickel-cadmium batteries, and nickel-hydrogen batteries. The lithium secondary batteries are being widely used due to high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

SUMMARY

The present disclosure can be implemented in some embodiments to provide an anode active material for a lithium secondary battery having improved power property and life-span property.

In an aspect of the present disclosure, a lithium secondary battery may include an anode active material for a lithium secondary battery with improved power property and life-span property.

An anode active material for a lithium secondary battery includes a silicon oxide particle. The silicon oxide particle has a core portion and a surface portion formed on the core portion, and an oxidation number ratio defined by Equation 1 of the silicon oxide particle is 1.7 or more, and less than 2.2, $$\text{Oxidation number ratio} = O_S / O_C \quad \text{[Equation 1]}$$

In Equation 1, $O_S$ is an oxidation number of silicon oxide at the surface portion obtained by an X-ray photoelectron spectroscopy (XPS) analysis, and $O_C$ is an oxidation number of silicon oxide at the core portion obtained by the XPS analysis.

In some embodiments, $O_S$ may be calculated by Equation 2.

$$O_S = (B + 2C + 3D + 4E) / (5A + 4B + 3C + 2D + E) \quad \text{[Equation 2]}$$

In Equation 2, A represents a peak area in a region from 98 eV to 100 eV measured by deconvolution of a Si2p spectrum of the surface portion obtained through the XPS analysis, B represents a peak area in a region from 100 eV to 101 eV measured by deconvolution of the Si2p spectrum of the surface portion obtained through the XPS analysis, C represents a peak area in a region from 101 eV to 102 eV measured by deconvolution of the Si2p spectrum of the surface portion obtained through the XPS analysis, D represents a peak area in a region from 102 eV to 103 eV measured by deconvolution of the Si2p spectrum of the surface portion obtained through the XPS analysis, and E represents a peak area in a region from 103 eV to 106 eV measured by deconvolution of the Si2p spectrum of the surface portion obtained through the XPS analysis.

In some embodiments, $O_C$ may be calculated by Equation 3.

$$O_C = (G + 2H + 3I + 4J) / (5F + 4G + 3H + 2I + J) \quad \text{[Equation 3]}$$

In Equation 3, F represents a peak area in a region from 98 eV to 100 eV measured by deconvolution of a Si2p spectrum of the core portion obtained through the XPS analysis, G represents a peak area in a region from 100 eV to 101 eV measured by deconvolution of the Si2p spectrum of the core portion obtained through XPS analysis, H represents a peak area in a region from 101 eV to 102 eV measured by deconvolution of the Si2p spectrum of the core portion obtained through XPS analysis, I represents a peak area in a region from 102 eV to 103 eV measured by deconvolution of the Si2p spectrum of the core portion obtained through XPS analysis, and J represents a peak area in a region from 103 eV to 106 eV measured by deconvolution of the Si2p spectrum of the core portion obtained through XPS analysis.

In some embodiments, a shortest distance from a surface of the silicon oxide particle to an outer surface of the core portion may be 300 nm or more.

In some embodiments, $O_C$ may be 0.8 or more.

In some embodiments, $O_C$ may be in a range from 0.8 to 1.0.

In some embodiments, the silicon oxide particle may include $SiO_X$ ($0<x\leq2$).

In some embodiments, a carbon coating may be formed on at least a portion of a surface of the silicon oxide particle.

In some embodiments, the silicon oxide particle may be doped with a metal including at least one of Li, Mg, Al, Ca, Fe, Ti or V.

A lithium secondary battery includes an anode including the anode active material for a lithium secondary battery based on the above-described embodiments, and a cathode facing the anode.

In some embodiments, the anode may further include a graphite-based active material.

In some embodiments, the graphite-based active material may include at least one selected from the group consisting of artificial graphite and natural graphite.

In one aspect of the present disclosure, an anode active material for a lithium secondary battery includes a core portion that includes a first silicon oxide occupying at least a central part of the silicon oxide particle and having a first oxidation number $O_C$ of the first silicon oxide obtained by an X-ray photoelectron spectroscopy (XPS) analysis, and a surface portion formed on the core portion including a second silicon oxide with a second oxidation number $O_S$ obtained by an XPS analysis. An oxidation number ratio of the surface portion and the core portion within the silicon oxide particle defined by Equation 1 is 1.7 or more, and less than 2.2.

$$\text{Oxidation number ratio} = O_S / O_C. \quad \text{[Equation 1]}$$

In an embodiment of the present disclosure, expansion of silicon oxide particles may be suppressed while facilitating movement of lithium ions during charging and discharging. Accordingly, both power and life-span properties may be improved.

In an embodiment of the present disclosure, a $SiO_2$ matrix may be sufficiently formed at an inside of the silicon oxide particles (e.g., in a core portion), so that expansion of the silicon oxide particles during charging and discharging may be suppressed. Accordingly, a capacity retention of the lithium secondary battery may be improved.

The anode active material and the lithium secondary battery based on some embodiments of the present disclosure can be widely applied in green technology fields such as an electric vehicle, a battery charging station, a solar power generation/wind power generation using the battery. The anode active material and the lithium secondary battery based on the present disclosure may be used in eco-friendly electric vehicles and hybrid vehicles for preventing a climate change by suppressing air pollution and greenhouse gas emissions.

DETAILED DESCRIPTION

Figure 1:
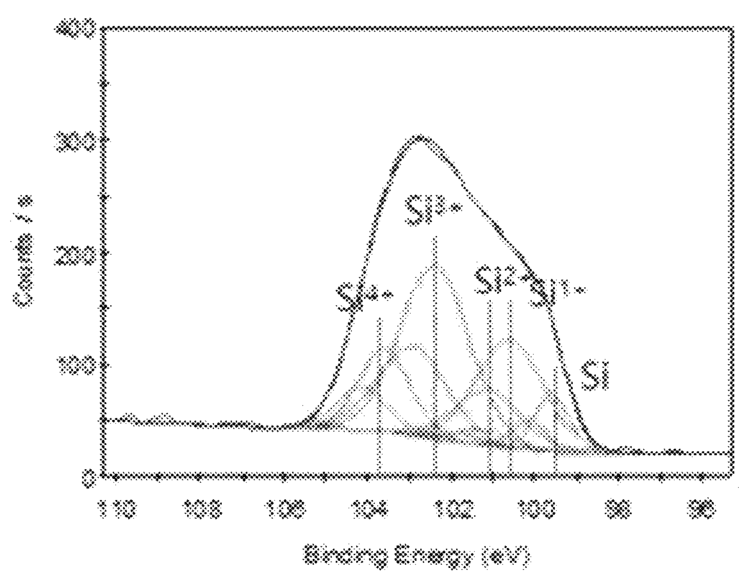
FIG. 1 is an example of Si2p spectrum obtained by an X-ray photoelectron spectroscopy (XPS) analysis on silicon oxide particles based on some example embodiments.

Section headings are used in the present document only for ease of understanding and do not limit scope of the embodiments to the section in which they are described.

With the broadening application of lithium secondary batteries, the demand for high-capacity, high-power lithium secondary batteries is increasing. Silicon-based particles having with high capacity may be used for an anode active material of a lithium secondary battery. However, the silicon-based particles have relatively low stability and life-span properties that can potentially degrade the secondary battery.

In order to address such issues, the present disclosure can be implemented in some embodiments to provide an anode active material for a lithium secondary battery including a silicon oxide particle. In addition, the present disclosure can be implemented in some embodiments to provide a lithium secondary battery including the anode active material.

Reference will now be made in detail to embodiments of the present disclosure, examples of which are illustrated in the accompanying drawings. However, the following description is merely an example and does not intended to limit the present disclosure to a specific implementation.

An anode active material for a lithium secondary battery includes a silicon oxide particle. In some implementations, the term "anode active material" may be used to indicate an anode active material for a lithium secondary battery. A plurality of the silicon oxide particles may be included in the anode active material.

The silicon oxide particle includes a core portion and a surface portion formed on the core portion.

In some embodiments, the core portion may include a first silicon oxide occupying at least a central part of the silicon oxide particle and having/exhibiting a first oxidation number $O_C$ obtained by an X-ray photoelectron spectroscopy (XPS) analysis. For example, the surface portion may include a second silicon oxide having/exhibiting a second oxidation number $O_S$ obtained by an XPS analysis. For example, the surface portion may be mostly formed outside the core portion.

For example, in some implementations, a shortest distance from the surface of the silicon oxide particle to an outer surface of the core portion may be 300 nm or more.

For example, in some implementations, the surface portion may be integrally formed with the core portion, and may be formed to surround the core portion. For example, a thickness of the surface portion may be less than 300 nm.

In some embodiments, the silicon oxide particle may include $SiO_X$ ($0<x\leq 2$).

For example, the silicon oxide particle may include a form in which silicon particles are distributed in a $SiO_2$ matrix. In some implementations, the $SiO_2$ matrix may alleviate the expansion of the silicon oxide particle, improving life-span properties while enhancing capacity properties of the silicon particles.

In some embodiments, the silicon oxide particle may be doped with an auxiliary element to reduce a resistance and improve power properties.

For example, the auxiliary element doped into the silicon oxide particle may include at least one metal selected from the group consisting of Li, Mg, Al, Ca, Fe, Ti and V.

In an embodiment, the auxiliary element may include Li or Mg.

An oxidation number ratio defined by Equation 1 below of the silicon oxide particle is 1.7 or more, and less than 2.2, $$\text{Oxidation number Ratio} = O_S / O_C \quad \text{[Equation 1]}$$

In Equation 1, $O_S$ is an oxidation number of silicon oxide at the surface portion obtained through an X-ray photoelectron spectroscopy (XPS) analysis, and $O_C$ is an oxidation number of silicon oxide at the core portion obtained through XPS analysis.

In some implementations, the term "oxidation number" used in connection with silicon oxide may represent a ratio of the number of moles of an oxygen element to the number of moles of a silicon element in the core portion or the surface portion of the silicon oxide particle obtained by the XPS.

For example, $O_S$ may be a ratio of the number of moles of the oxygen element to the number of moles of the silicon element obtained through the XPS of the surface portion. For example, $O_S$ may be a z value when a silicon oxide composition of the surface portion is expressed as $SiO_z$.

For example, $O_c$ may be a ratio of the number of moles of the oxygen element to the number of moles of the silicon element obtained through the XPS of the core portion. For example, $O_c$ may be a y value when a silicon oxide composition of the core portion is expressed as $SiO_y$.

Within the oxidation number ratio range, movement of the lithium ions during charging and discharging may be facilitated while suppressing an expansion of the silicon oxide particle. Accordingly, power and life-span properties may be both improved.

For example, if the oxidation number ratio is 2.2 or more, a thickness of an oxide layer of the surface portion may be increased to lower a mobility of the lithium ions. Accordingly, an initial efficiency of the lithium secondary battery may be decreased.

For example, if the oxidation number ratio is less than 1.7, the $SiO_2$ matrix may not be sufficiently formed in the core portion, and an anode swelling may be caused and the capacity retention of the lithium secondary battery may be decreased.

FIG. 1 is a graph of Si2p spectrum obtained by an XPS analysis on silicon oxide particles based on example embodiments.

Referring to FIG. 1, an Si2p spectrum graph of the core portion and/or the surface portion of the silicon oxide particle may be obtained through the XPS.

For example, the obtained Si2p spectrum may be separated into peak regions representing $Si^0$, $Si^{1+}$, $Si^{2+}$, $Si^{3+}$ and $Si^{4+}$, respectively, by a deconvolution.

For example, the $Si^0$ peak region may correspond to a region of a binding energy from 98 eV to 100 eV, the $Si^{1+}$ peak region may correspond to a region of a binding energy from 100 eV to 101 eV, the $Si^{2+}$ peak region may correspond to a region of a binding energy from 101 eV to 102 eV, the $Si^{3+}$ peak region may correspond to a region of a binding energy from 102 eV to 103 eV, and the $Si^{4+}$ peak region may correspond to a region of a binding energy from 103 eV to 106 eV.

The number of silicon atoms and the number of oxygen atoms in each peak region can be calculated through the obtained peak areas of $Si^0$, $Si^{1+}$, $Si^{2+}$, $Si^{3+}$ and $Si^{4+}$. The oxidation number of the silicon oxide at the surface portion and/or the core portion may be obtained through the calculated total number of the silicon atoms and the total number of the oxygen atoms.

For example, for the XPS analysis, the silicon oxide particle may be assumed to have silicon elements distributed in a Si—O matrix structure.

In some embodiments, the oxidation number ($O_S$) of the silicon oxide of the surface portion may be calculated by Equation 2 below.

$$O_S=(B+2C+3D+4E)/(5A+4B+3C+2D+E) \quad \text{[Equation 2]}$$

In Equation 2, A represents a peak area in a region from 98 eV to 100 eV measured by deconvolution of the Si2p spectrum of the surface portion obtained through the XPS analysis. B represents a peak area in a region from 100 eV to 101 eV measured by deconvolution of the Si2p spectrum of the surface portion obtained through the XPS analysis. C represents a peak area in a region from 101 eV to 102 eV measured by deconvolution of the Si2p spectrum of the surface portion obtained through the XPS analysis. D represents a peak area in a region from 102 eV to 103 eV measured by deconvolution of the Si2p spectrum of the surface portion obtained through the XPS analysis. E represents a peak area in a region from 103 eV to 106 eV measured by deconvolution of the Si2p spectrum of the surface portion obtained through the XPS analysis.

In some embodiments, the oxidation number ($O_C$) of the silicon oxide of the core portion may be calculated through Equation 3 below.

$$O_C=(G+2H+3I+4J)/(5F+4G+3H+2I+J) \quad \text{[Equation 3]}$$

In Equation 3, F represents a peak area in a region from 98 eV to 100 eV measured by deconvolution of the Si2p spectrum of the core portion obtained through the XPS analysis. G represents a peak area in a region from 100 eV to 101 eV measured by deconvolution of the Si2p spectrum of the core portion obtained through XPS analysis. H represents a peak area in a region from 101 eV to 102 eV measured by deconvolution of the Si2p spectrum of the core portion obtained through XPS analysis. I represents a peak area in a region from 102 eV to 103 eV measured by deconvolution of the Si2p spectrum of the core portion obtained through XPS analysis. J represents a peak area in a region from 103 eV to 106 eV measured by deconvolution of the Si2p spectrum of the core portion obtained through XPS analysis.

For example, even though an average oxidation number of the entire silicon oxide particle is the same, the oxidation numbers of the silicon oxide included in the core portion or the surface portion may be different from each other. The oxidation numbers of each of the silicon oxides included in the core portion and the surface portion of the single silicon oxide particle can be obtained through Equations 2 and 3 above. Accordingly, a degree of oxidation of the silicon oxide according to the position in the silicon oxide particle may be evaluated and controlled.

For example, $O_C$ may be calculated from data obtained by etching to a depth of 300 nm or more from the surface of the silicon oxide particle using an argon ion gun of the XPS analysis.

For example, after etching to a depth of 300 nm or more from the surface of the silicon oxide particle using the argon ion gun, the Si2p spectrum graph may be obtained and the above-described peak areas may be measured by the deconvolution of the graph.

In some embodiments, $O_C$ may be 0.8 or more, and may be in a range from 0.8 to 1.0 in an embodiment. Within this range, the $SiO_2$ matrix may be sufficiently formed at the inside of the silicon oxide particle (e.g., the core portion) to suppress expansion of the silicon oxide particle during charging and discharging. Thus, the capacity retention of the lithium secondary battery may be improved.

Hereinafter, a preparation method of the anode active material for a lithium secondary battery as described above based on example embodiments is provided.

In some example embodiments, a silicon oxide particle may be formed by mixing and firing a silicon source.

For example, the silicon source may include at least one selected from the group consisting of silicon and silicon dioxide ($SiO_2$). In an embodiment, a mixture of silicon and silicon dioxide may be used as the silicon source.

For example, the silicon source may be mixed, introduced into a reactor, and calcined at a temperature from about 1200° C. to 1600° C. in a vacuum atmosphere.

In example embodiments, the calcined mixture of the silicon source may be deposited on a cooling plate and cooled. A temperature of the cooling plate may be FROM about 700° C. to 900° C.

The cooled silicon source mixture may be pulverized/ground and classified to form the silicon oxide particles.

For example, the oxidation number ratio of the silicon oxide particle may be adjusted by controlling the calcination temperature of the reactor and/or the temperature of the cooling plate.

For example, a plurality of the silicon oxide particles may be formed by changing the calcination temperature of the reactor and the temperature of the cooling plate, and particles having the oxidation number ratio of 1.7 or more and less than 2.2 may be selected and used as the anode active material among the formed silicon oxide particles, In some embodiments, the prepared silicon oxide particle and a carbon source gas may be mixed and fired to form a carbon coating on at least a portion of a surface of the silicon oxide particle For example, the carbon source gas may be a mixed gas of a methane gas and an argon gas.

In some embodiments, the methane gas may be replaced with an ethylene gas, a propylene gas or an acetylene gas, or may be used together with the ethylene gas, the propylene gas or the acetylene gas.

In some embodiments, the carbon coating may be formed by a chemical vapor deposition (CVD). For example, a carbon source gas may be injected to the silicon oxide particles while firing at a temperature from about 400° C. to 1200° C. to form the carbon coating. For example, a heating rate during the firing may be in a range from 5° C./min to 20° C./min, and a firing time may be in a range from 60 minutes to 360 minutes.

Figure 2:
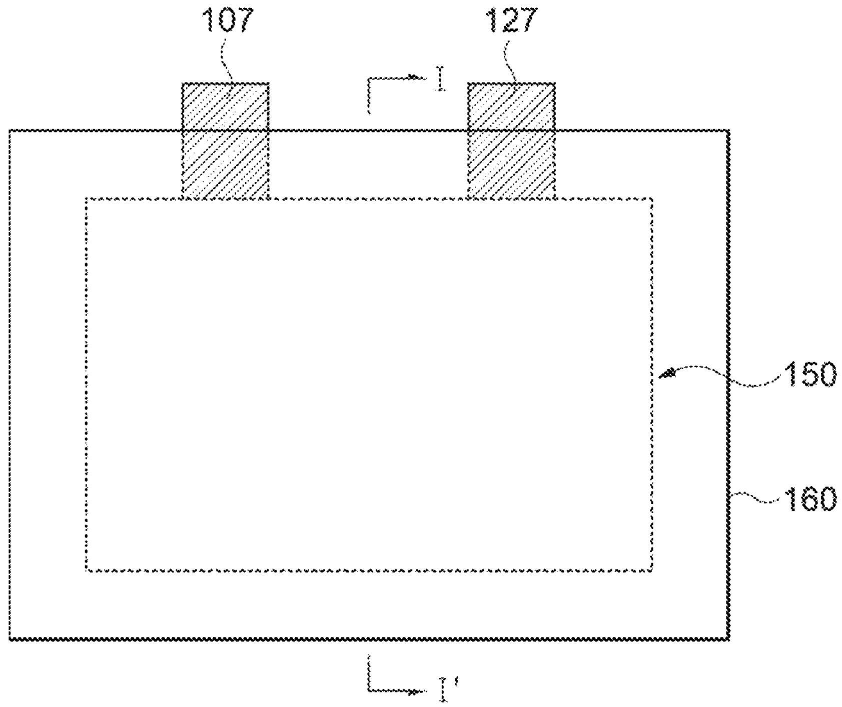
FIG. 2 is a schematic plan view illustrating a secondary battery based on some example embodiments.
Figure 3:
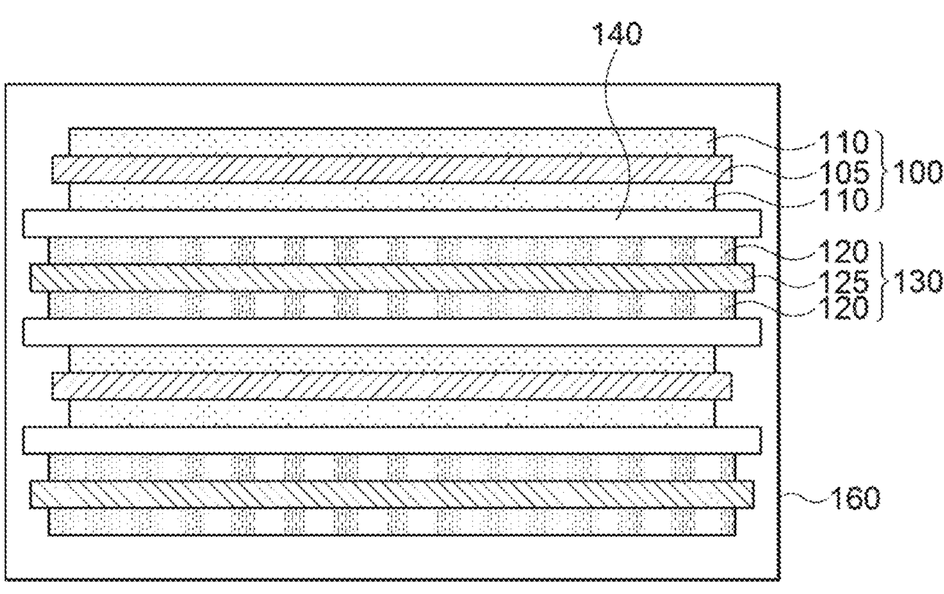
FIG. 3 is a schematic cross-sectional view illustrating a secondary battery based on some example embodiments.

FIGS. 2 and 3 are a schematic plan view and a schematic cross-sectional view illustrating a secondary battery based on some exemplary embodiments. For example, FIG. 3 is a cross-sectional view taken along a line I-I' of FIG. 2 in a thickness direction.

Referring to FIGS. 2 and 3, the lithium secondary battery includes a cathode 100 and an anode 130 facing the cathode 100 and including the anode active material as described above.

For example, the cathode 100 may include a cathode current collector 105 and a cathode active material layer 110 disposed on at least one surface of the cathode current collector 105.

The cathode current collector 105 may include stainless steel, nickel, aluminum, titanium, or an alloy thereof. The cathode current collector 105 may include aluminum or stainless steel surface-treated with carbon, nickel, titanium or silver. For example, a thickness of the cathode current collector 105 may be in a range from 10 μm to 50 μm.

The cathode active material layer 110 may include a cathode active material. The cathode active material may include a compound capable of reversibly intercalating and de-intercalating lithium ions.

In example embodiments, the cathode active material may include a lithium-nickel metal oxide. The lithium-nickel metal oxide may further include at least one of cobalt (Co), manganese (Mn) and aluminum (Al).

In some embodiments, the cathode active material or the lithium-nickel metal oxide may include a layered structure or a crystal structure represented by Chemical Formula 1 below.

[Chemical Formula 1]

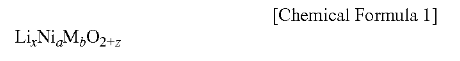

$$Li_xNi_aM_bO_{2+z}$$

In Chemical Formula 1, 0.9≤x≤1.2, 0.6≤a≤0.99, 0.01≤b≤0.4 and −0.5≤z≤0.1. As mentioned above, M may include Co, Mn and/or Al.

The chemical structure represented by Chemical Formula 1 indicates a bonding relationship included in the layered structure or the crystal structure of the cathode active material, and is not intended to exclude another additional element. For example, M includes Co and/or Mn, and Co and/or Mn may serve as main active elements of the cathode active material together with Ni. Chemical Formula 1 is provided to express the bonding relationship of the main active elements, and is to be understood as a formula encompassing introduction and substitution of the additional element.

In an embodiment, an auxiliary element for enhancing chemical stability of the cathode active material or the layered structure/crystal structure may be further included in addition to the main active element. The auxiliary element may be incorporated into the layered structure/crystal structure to form a bond, and it is to be understood that this case is also included within the chemical structure represented by Chemical Formula 1.

The auxiliary element may include at least one of, e.g., Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr. The auxiliary element may act as an auxiliary active element such as Al which may contribute to capacity/power activity of the cathode active material together with Co or Mn, For example, the cathode active material or the lithium-nickel metal oxide may have a layered structure or a crystal structure represented by Chemical Formula 1-1 below.

[Chemical Formula 1-1]

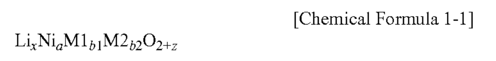

$$Li_xNi_aM1_{b1}M2_{b2}O_{2+z}$$

In Chemical Formula 1-1, M1 may include Co, Mn and/or Al. M2 may include the above-described auxiliary element. In Chemical Formula 1-1, 0.9≤x≤1.2, 0.6≤a≤0.99, 0.01≤b1+b2≤0.4, and −0.5≤z≤0.1.

The cathode active material may further include a coating element or a doping element. For example, an element that is substantially the same as or similar to the above-mentioned auxiliary element may be used as the coating element or the doping element. For example, one of the above elements or a combination of two or more of the above elements may be used as the coating element or the doping element.

In an implementation, the coating element or the doping element may be disposed on a surface of the lithium-nickel metal oxide particle. In another implementation, the coating element or the doping element may penetrate through the surface of the lithium-nickel metal oxide particle. In some implementations, the coating element or the doping element may be included in the bonding structure represented by Chemical Formula 1 or Chemical Formula 1-1.

The cathode active material may include a nickel-cobalt-manganese (NCM)-based lithium oxide. In this case, an NCM-based lithium oxide having an increased nickel content may be used.

Ni may serve as a transition metal related to the power and capacity of a lithium secondary battery. Therefore, as described above, a high-Ni composition may be employed for the cathode active material, so that a high-capacity cathode and a high-capacity lithium secondary battery may be implemented.

However, as the content of Ni increases, long-term storage stability and life-span stability of the cathode or the secondary battery may be relatively deteriorated, and side reactions with the electrolyte may be also increased. However, in example embodiments, life-span stability and capacity retention may be improved by Mn while maintaining electrical conductivity by the inclusion of Co.

A Ni content (e.g., A mole fraction of nickel among total moles of nickel, cobalt and manganese) in the NCM-based lithium oxide may be 0.6 or more, 0.7 or more, or 0.8 or more. In some embodiments, the Ni content may be from 0.8 to 0.95, from 0.82 to 0.95, from 0.83 to 0.95, from 0.84 to 0.95, from 0.85 to 0.95, or from 0.88 to 0.95.

In some embodiments, the cathode active material may include a lithium cobalt oxide-based active material, a lithium manganese oxide-based active material, a lithium nickel oxide-based active material, or a lithium iron phosphate (LFP) active material (e.g., $LiFePO_4$).

In some embodiments, the cathode active material may include at least one of a Li-rich layered oxide (LLO)/an over lithiated oxide (OLO)-based active material, a Mn-rich-based active material, or a Co-less active materials having, e.g., a chemical structure or a crystal structure represented by Chemical Formula 2. These materials may be used alone or in combination with other materials.

[Chemical Formula 2]

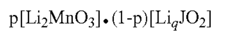

$$p[Li_2MnO_3]\cdot(1-p)[Li_qJO_2]$$

In Chemical Formula 2, $0<p<1$, $0.9\leq q\leq 1.2$, and J includes at least one element selected from Mn, Ni, Co, Fe, Cr, V, Cu, Zn, Ti, Al, Mg and B.

A cathode slurry may be prepared by mixing the cathode active material in a solvent. The cathode slurry may be coated on at least one surface of the cathode current collector 105, and dried and pressed to form the cathode active material layer 110. The coating method may include a gravure coating, a slot die coating, a multi-layer simultaneous die coating, an imprinting coating, a doctor blade coating, a dip coating, a bar coating, a casting, etc. The cathode active material layer 110 may further include a binder, and may optionally further include a conductive material, a thickener, etc.

A non-aqueous solvent may be used as the solvent. For example, N-methyl-2-pyrrolidone (NMP), dimethylformamide, dimethylacetamide, N,N-dimethylaminopropylamine, ethylene oxide, tetrahydrofuran, etc., may be used as the solvent.

For example, the binder may include an organic based binder such as polyvinylidenefluoride (PVDF), a vinylidene fluoride-hexafluoropropylene copolymer, polyacrylonitrile, polymethylmethacrylate, acrylonitrile butadiene rubber (NBR), polybutadiene rubber (BR), styrene-butadiene rubber (SBR), etc. These materials may be used alone or in combination with other materials.

For example, a PVDF-based binder may be used as a cathode binder. In this case, an amount of the binder for forming the cathode active material layer may be reduced, and an amount of the cathode active material may be relatively increased. Thus, the capacity and power of the lithium secondary battery may be further improved.

The conductive material may be included to promote an electron movement between active material particles. For example, the conductive material may include a carbon-based conductive material such as graphite, carbon black, acetylene black, ketjen black, graphene, carbon fiber (such as carbon nanotube, vapor-grown carbon fiber (VGCF)), etc., and/or a metal-based conductive material including tin, tin oxide, titanium oxide, a perovskite material such as $LaSrCoO_3$ and $LaSrMnO_3$, etc. These materials may be used alone or in combination with other materials.

The cathode slurry may further include a thickener and/or a dispersive agent. In an embodiment, the cathode slurry may include the thickener such as carboxymethyl cellulose (CMC).

The anode 130 may include an anode current collector 125 and an anode active material layer 120 formed on at least one surface of the anode current collector 125.

For example, the anode current collector 125 may include a copper foil, a nickel foil, a stainless steel foil, a titanium foil, a nickel foam, a copper foam, or a polymer substrate coated with a conductive metal. These materials may be used alone or in combination with other materials. For example, a thickness of the anode current collector 125 may be in a range from 10 μm to 50 μm.

The anode active material layer 120 may include the anode active material including the above-described the silicon oxide particle. For example, the anode active material may include a plurality of the silicon oxide particles.

In some embodiments, the anode active material may further include a graphite-based active material. For example, the graphite-based active material may include artificial graphite and/or natural graphite.

For example, a content of the graphite-based active material based on a total weight of the silicon oxide particles and the graphite-based active material may be in a range from 0 wt % to 97 wt %.

A content of the silicon oxide particles in a total weight of the anode active material (e.g., the total weight of the silicon oxide particles and the graphite-based active material) may be 3 wt % or more, 5 wt % or more, 10 wt % or more, 15 wt % or more, 20 wt % or more, 25 wt % or more, 30 wt % or more, 35 wt % or more, 40 wt % or more, or 45% by weight or more.

The content of the silicon oxide particle based on the total weight of the anode active material may be 90 wt % or less, 85 wt % or less, 80 wt % or less, 75 wt % or less, 70 wt % or less, 65 wt % or less, 60 wt % or less, 55 wt % or less % or less, or 50 wt % or less.

In an embodiment, the anode active material may substantially consist of the silicon oxide particles and the graphite-based active material.

An anode slurry may be prepared by mixing the anode active material in a solvent. The anode slurry may be coated/deposited on the anode current collector 125, and then dried and pressed to form the anode active material layer 120. The coating method may include a gravure coating, a slot die coating, a multi-layer simultaneous die coating, an imprinting coating, a doctor blade coating, a dip coating, a bar coating, a casting, etc. The anode active material layer 120 may further include a binder, and may optionally further include a conductive material, a thickener, etc.

The solvent included in the anode slurry may include water (such as pure water, deionized water, distilled water), ethanol, isopropanol, methanol, acetone, n-propanol, t-butanol, or others. These materials may be used alone or in combination with other materials.

The above-described materials that may be used in the fabrication of the cathode 100 may be used as the binder, the conductive material and the thickener.

In some embodiments, a styrene-butadiene-rubber (SBR)-based binder, carboxymethyl cellulose (CMC), a polyacrylic acid-based binder, a polyethylenedioxythiophene (poly(3,4-ethylenedioxythiophene), PEDOT)-based binder, etc., may be used. These materials may be used alone or in combination with other materials.

In some embodiments, a separator 140 may be interposed between the anode 100 and the cathode 130. An ion flow may be generated through the separator 140 while preventing an electrical short between the anode 100 and the cathode 130. For example, the separator 140 may have a thickness of 10 μm to 20 μm.

For example, the separator 140 may include a porous polymer film or a porous nonwoven fabric.

The porous polymer film may include a polyolefin-based polymer such as an ethylene polymer, a propylene polymer, an ethylene/butene copolymer, an ethylene/hexene copolymer, an ethylene/methacrylate copolymer, etc. These materials may be used alone or in combination with other materials.

The porous nonwoven fabric may include a glass fiber with a high melting point, a polyethylene terephthalate fiber, etc.

The separator 140 may also include a ceramic-based material. For example, inorganic particles may be coated on the polymer film or dispersed in the polymer film to improve heat resistance.

The separator 140 may have a single-layered or multi-layered structure including the above-described polymer film and/or the nonwoven fabric.

In some example embodiments, an electrode cell may be defined by the cathode 100, the anode 130 and the separator 140, and a plurality of the electrode cells may be stacked to form an electrode assembly 150 having, e.g., a jellyroll shape. For example, the electrode assembly 150 may be formed by winding, stacking, z-folding and stack-folding of the separator 140.

The electrode assembly 150 may be accommodated in a case 160 together with an electrolyte to define a lithium secondary battery. In example embodiments, a non-aqueous electrolyte may be used as the electrolyte.

The non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), butylene carbonate, diethyl carbonate (DEC), dimethyl carbonate (DMC), ethylmethyl carbonate (EMC), methylpropyl Carbonate, ethylpropyl carbonate, dipropyl carbonate, vinylene carbonate, methyl acetate (MA), ethyl acetate (EA), n-propylacetate (n-PA), 1,1-dimethyl ethyl acetate (DMEA), methyl propionate (MP), ethylpropionate (EP), fluoroethyl acetate (FEA), difluoroethyl acetate (DFEA), trifluoroethyl acetate (TFEA), dibutyl ether, tetraethylene glycol dimethyl ether (TEGDME), diethylene glycol dimethyl ether (DEGDME), dimethoxyethane, tetrahydrofuran (THF), 2-methyltetrahydrofuran, ethyl alcohol, isopropyl alcohol, dimethylsulfoxide, acetonitrile, dimethoxyethane, diethoxyethane, sulfolane, gamma-butyrolactone, propylene sulfite, etc. These materials may be used alone or in combination with other materials.

The non-aqueous electrolyte may further include an additive. The additive may include, e.g., a cyclic carbonate-based compound, a fluorine-substituted carbonate-based compound, a sultone-based compound, a cyclic sulfate-based compound, a cyclic sulfite-based compound, a phosphate-based compound, a borate-based compound, etc. These materials may be used alone or in combination with other materials.

The cyclic carbonate-based compound may include vinylene carbonate (VC), vinyl ethylene carbonate (VEC), etc.

The fluorine-substituted cyclic carbonate-based compound may include fluoroethylene carbonate (FEC), etc.

The sultone-based compound may include 1,3-propane sultone, 1,3-propene sultone, 1,4-butane sultone, etc.

The cyclic sulfate-based compound may include 1,2-ethylene sulfate, 1,2-propylene sulfate, etc.

The cyclic sulfite-based compound may include ethylene sulfite, butylene sulfite, etc.

The phosphate-based compound may include at least one of lithium difluoro bis-oxalato phosphate, or lithium difluoro phosphate.

The borate-based compound may include lithium bis (oxalate) borate, etc.

In some embodiments, a solid electrolyte may be used instead of the above-mentioned non-aqueous electrolyte. In this case, the lithium secondary battery may be manufactured in the form of an all-solid-state battery. Additionally, a solid electrolyte layer may be disposed between the anode 100 and the cathode 130 instead of the above-described separator 140 as.

The solid electrolyte may include a sulfide-based electrolyte. Non-limiting examples of the sulfide-based electrolyte may include $Li_2S—P_2S_5$, $Li_2S—P_2S_5—LiCl$, $Li_2S—P_2S_5—LiBr$, $Li_2S—P_2S_5—LiCl—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (m and n are positive numbers, and Z represents Ge, Zn pr Ga), $Li_2S—GeS_2$, $Li_2S—SiS_2—Li_3PO_4$, $Li_2S—SiS_2\text{-}Li_pMO_q$, (p and q are positive numbers, M represents P, Si, Ge, B, Al, Ga or In), $Li_{7-x}PS_{6-x}Cl_x$ $(0≤x≤2)$, $Li_{7-x}PS_{6-x}Br_x$ $(0≤x≤2)$, $Li_{7-x}PS_{6-x}I_x$ $(0≤x≤2)$, etc. These materials may be used alone or in combination with other materials.

In an embodiment, the solid electrolyte may include, e.g., an oxide-based amorphous solid electrolyte such as $Li_2O—B_2O_3—P_2O_5$, $Li_2O—SiO_2$, $Li_2O—B_2O_3$, and $Li_2O—B_2O_3—ZnO$.

As illustrated in FIGS. 2 and 3, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Experimental examples discussed below show some embodiments of the present disclosure Example 1

(1) Preparation of Anode Active Material

A mixture of silicon (Si) and silicon dioxide ($SiO_2$) as a raw material was put into a reactor and fired for 5 hours under a vacuum atmosphere of 10 Pa. During the firing, a temperature of the reactor was maintained at 1400° C.

The fired mixture was deposited on a cooling plate and cooled. A temperature of the cooling plate was maintained at 800° C.

The deposited material was taken out from the cooling plate and pulverized and classified by a ball mill to obtain silicon oxide particles having an average particle diameter (D50) of 6 μm.

The prepared silicon oxide particles were placed in a CVD coater, and a mixed gas of a methane gas and an argon gas was injected at a flow rate of 50 mL/min to 100 mL/min. A temperature of the CVD coater was increased to 900° C. at a heating rate of 5° C./min to 20° C./min, and maintained at 900° C. for about 60 minutes to 360 minutes to form a carbon coating on at least a portion of a surface of the silicon oxide particles.

The silicon oxide particles having the carbon coating formed thereon were used as an anode active material.

(2) Fabrication of Lithium Secondary Battery 10 wt % of the prepared anode active material, 85.5 wt % of artificial graphite, 1 wt % of MWCNT as a conductive material, 2 wt % of styrene-butadiene rubber (SBR) as a binder and 1.5 wt % of carboxymethyl cellulose (CMC) as a thickener were mixed in pure water as a solvent to obtain an anode slurry.

The anode slurry was coated on a copper substrate, dried and pressed to fabricate an anode.

A lithium secondary battery including the prepared anode and a Li metal as a counter electrode (cathode) was fabricated.

Specifically, a lithium coin half-cell was constructed by interposing a separator (polyethylene, thickness of 20 m) between the prepared anode and the lithium metal (thickness of 1 mm).

The assembly of the lithium metal/separator/anode was placed in a coin cell plate, an electrolyte solution was injected, and a cap was covered and clamped. The electrolyte solution was prepared by adding 2.0 vol % of FEC based on a total volume of the electrolyte solution to a 1.0M $LiPF_6$ solution using a mixed solvent of EC/EMC (30:70, volume ratio).

After impregnation for 3 hours to 24 hours after the clamping, a formation charging/discharging was performed (charging condition CC-CV 0.1C 0.01V 0.01C CUT-OFF, discharging condition CC 0.1C 1.5V CUT-OFF).

Example 2

An anode active material and a lithium secondary battery were prepared by the same method as that in Example 1, except that the temperature of the cooling plate was maintained at 825° C.

Example 3

An anode active material and a lithium secondary battery were prepared by the same method as that in Example 1, except that the temperature of the cooling plate was maintained at 850° C.

Example 4

An anode active material and a lithium secondary battery were prepared by the same method as that in Example 1, except that the temperature of the cooling plate was maintained at 875° C.

Example 5

An anode active material and a lithium secondary battery were prepared by the same method as that in Example 1, except that the temperature of the cooling plate was maintained at 900° C.

Example 6

An anode active material and a lithium secondary battery were prepared by the same method as that in Example 1, except that the temperature of the reactor was maintained at 1450° C. and the temperature of the cooling plate was maintained at 825° C.

Example 7

An anode active material and a lithium secondary battery were prepared by the same method as that in Example 1, except that the temperature of the reactor was maintained at 1350° C. and the temperature of the cooling plate was maintained at 800° C.

Comparative Example 1

An anode active material and a lithium secondary battery were prepared by the same method as that in Example 1, except that the temperature of the reactor was maintained at 1350° C. and the temperature of the cooling plate was maintained at 775° C.

Comparative Example 2

An anode active material and a lithium secondary battery were prepared by the same method as that in Example 1, except that the temperature of the reactor was maintained at 1450° C. and the temperature of the cooling plate was maintained at 850° C.

Experimental Example (1) Measurement of Oxidation Number Ratio Through XPS Analysis 1) Measurement of Oxidation Number ($O_S$) of Silicon Oxide on a Surface of Silicon Oxide Particle The anode active material prepared based on each of Examples and Comparative Examples was attached on a carbon tape to prepare a sample, and an XPS analysis was performed under the following conditions to obtain a Si2p spectrum of a surface portion of the silicon oxide particle.

[XPS Analysis Conditions]

i) X-ray type: Al k alpha, 1486.68 eV, 900 μm Beam size
ii) Analyzer: CAE (constant analyzer energy) Mode
iii) Number of scans: 50
iv) Pass energy: 20 eV
v) Dwell Time: 100 ms A deconvolution of the obtained Si2p spectrum was performed, and a peak area in a region of 98 eV to 100 eV (A), a peak area in a region of 100 eV to 101 eV (B), a peak area in a region of 101 eV to 102 eV (C), a peak area in a region of 102 eV to 103 eV (D), and a peak area in a region of 103 eV to 106 eV (E) were measured.

The measured each peak area was substituted into Equation 2 as described above to obtain an oxidation number ($O_S$) of silicon oxide on a surface portion of the silicon oxide particle.

2) Measurement of Oxidation Number ($O_C$) of Silicon Oxide in Core Portion of Silicon Oxide Particle The anode active material prepared based on each of Examples and Comparative Examples was attached on a carbon tape to form a sample, and an XPS analysis was performed under the following conditions to obtain a Si2p spectrum of a core portion of the silicon oxide particle.

[XPS Analysis Conditions]

i) X-ray type: Al k alpha, 1486.68 eV, 900 μm Beam size
ii) Analyzer: CAE (constant analyzer energy) Mode
iii) Number of scans: 50
iv) Pass energy: 20 eV
v) Dwell Time: 100 ms
vi) Ion gun: Ar ion
vii) Ion energy: 4000 eV
viii) Etch Cycle: 300s
ix) Total Levels: 20

Specifically, the surface of the silicon oxide particle based on each of Examples and Comparative Examples was etched 20 times for 300 seconds (total 6000 seconds) under the above conditions, and a Si2p spectrum in a region (core portion) where the shortest distance from the particle surface was 300 nm or more was obtained.

A deconvolution of the obtained Si2p spectrum was performed, and a peak area in a region of 98 eV to 100 eV (F), a peak area in a region of 100 eV to 101 eV (G), a peak area in a region of 101 eV to 102 eV (H), a peak area in a region of 102 eV to 103 eV (I), and a peak area in a region of 103 eV to 106 eV (J) were measured.

The measured each peak area was substituted into Equation 3 as described above to obtain an oxidation number ($O_C$) of silicon oxide from a core portion of the silicon oxide particle.

3) Calculation of Oxidation Number Ratio ($O_S/O_C$)

The oxidation number ratio defined by Equation 1 was calculated by dividing the obtained $O_S$ by $O_C$.

(2) Evaluation of Initial Efficiency

After the formation charging and discharging of the lithium secondary battery manufactured according to each of Examples and Comparative Examples, charging (CC-CV 0.1C 0.01V 0.05C CUT-OFF) and discharging (CC 0.1C 1.0V CUT-OFF) at room temperature (25° C.) was performed once to measure an initial discharge capacity and an initial charge capacity. Based on a charge capacity and a discharge capacity of artificial graphite, a charge capacity and a discharge capacity of the silicon oxide particle were calculated according to the content ratio of the silicon oxide particle.

The initial efficiency was evaluated as a percentage by dividing the measured initial charge capacity by the measured initial discharge capacity.

(3) Evaluation of Electrode Expansion Ratio

After pressing the anode of the lithium secondary battery manufactured according to each of Examples and Comparative Examples, a thickness of the anode (an initial anode thickness) was measured.

An anode thickness (expanded anode thickness) immediately after charging (CC-CV 0.1C 0.01V 0.05C CUT-OFF) was performed at room temperature (25° C.) for the lithium secondary battery manufactured according to each of Examples and Comparative Examples was measured.

The electrode expansion ratio was calculated by substituting the measured initial anode thickness and the expanded anode thickness into the following equation.

$$\text{Electrode expansion ratio (\%)} = \left\{ \frac{(\text{expanded anode thickness} - \text{initial anode thickness})}{(\text{initial anode thickness})} \right\} * 100$$

(4) Evaluation on Capacity Retention 50 cycles of charge (CC-CV 0.1C 0.01V 0.05C CUT-OFF) and discharge (CC 0.1C 1.0V CUT-OFF) for the lithium secondary battery according to each of Examples and Comparative Examples were performed.

The capacity retention was evaluated as a percentage of a discharge capacity at the 50th cycle relative to a discharge capacity at the 1st cycle.

$O_S$, $O_C$ and the oxidation number ratio ($O_S/O_C$), and the evaluation results are shown in Tables 1 and 2 below.

TABLE 1

| No. | $O_S$ | $O_C$ | oxidation number ratio ($O_S/O_C$) |
|---|---|---|---|
| Example 1 | 1.85 | 1.02 | 1.81 |
| Example 2 | 1.69 | 0.98 | 1.72 |
| Example 3 | 1.87 | 0.88 | 2.13 |
| Example 4 | 1.75 | 0.80 | 2.19 |
| Example 5 | 1.55 | 0.75 | 2.07 |
| Example 6 | 1.87 | 0.99 | 1.89 |
| Example 7 | 1.70 | 0.91 | 1.87 |
| Comparative Example 1 | 1.64 | 0.97 | 1.69 |
| Comparative Example 2 | 1.91 | 0.87 | 2.20 |

TABLE 2

| No. | initial discharge capacity (mAh/g) | initial charge capacity (mAh/g) | initial efficiency (%) | electrode expansion ratio (%) | capacity retention (50 cyc, %) |
|---|---|---|---|---|---|
| Example 1 | 1724 | 1340 | 77.7 | 24.4 | 98.5 |
| Example 2 | 1780 | 1367 | 76.8 | 26.4 | 99.2 |
| Example 3 | 1824 | 1421 | 77.9 | 25.2 | 99.4 |
| Example 4 | 1856 | 1425 | 76.8 | 24.1 | 99.5 |
| Example 5 | 2178 | 1616 | 74.2 | 39.6 | 96.1 |
| Example 6 | 1788 | 1377 | 77.0 | 25.3 | 99.1 |
| Example 7 | 1766 | 1372 | 77.7 | 24.8 | 99.0 |
| Comparative Example 1 | 1690 | 1315 | 77.8 | 40.7 | 95.2 |
| Comparative Example 2 | 2001 | 1419 | 70.9 | 28.5 | 98.3 |

Referring to Tables 1 and 2, in Examples having the oxidation number ratio as defined by Equation 1 of 1.7 or more and less than 2.2, the initial efficiency and capacity retention were entirely improved and electrode expansion ratio was reduced compared to those from Comparative Examples.

In Example 5 where the oxidation number ($O_C$) of the silicon oxide in the core portion was less than 0.8, the initial efficiency and the capacity retention were relatively reduced.

In Comparative Example 1 where the oxidation number ratio was less than 1.7, the $SiO_2$ matrix was not sufficiently formed in the core portion of the silicon oxide particle. Accordingly, the electrode expansion ratio increased and the capacity retention was explicitly decreased.

In Comparative Example 2 where the oxidation number ratio was 2.2 or more, an excessively thick oxide layer was formed on the surface of the silicon oxide particle to remarkably deteriorate the initial efficiency.

The present disclosure can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the present disclosure can be implemented in some embodiments to provide improved electrochemical devices such as a battery used in various power sources and power supplies, thereby mitigating climate changes in connection with uses of power sources and power supplies. Lithium secondary batteries based on the present disclosure can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. An anode active material for a lithium secondary battery comprising a silicon oxide particle and a carbon coating formed on at least a portion of a surface of the silicon oxide particle, wherein the silicon oxide particle has a core portion and a surface portion formed on the core portion, and an oxidation number ratio defined by Equation 1 of the silicon oxide particle is 2.13 to 2.19, $$\text{Oxidation number ratio} = O_S / O_C \qquad \text{[Equation 1]}$$

wherein, in Equation 1, $O_S$ is an oxidation number of silicon oxide at the surface portion obtained by an X-ray photoelectron spectroscopy (XPS) analysis, and $O_C$ is an oxidation number of silicon oxide at the core portion obtained by the XPS analysis.

2. The anode active material for a lithium secondary battery according to claim 1, wherein $O_S$ is calculated by Equation 2:

$$O_S = (B + 2C + 3D + 4E) / (5A + 4B + 3C + 2D + E) \qquad \text{[Equation 2]}$$

wherein, in Equation 2, A represents a peak area in a region from 98 eV to 100 eV measured by deconvolution of an Si2p spectrum of the surface portion, B represents a peak area in a region from 100 eV to 101 eV measured by deconvolution of the Si2p spectrum of the surface portion, C represents a peak area in a region from 101 eV to 102 eV measured by deconvolution of the Si2p spectrum of the surface portion, D represents a peak area in a region from 102 eV to 103 eV measured by deconvolution of the Si2p spectrum, and E represents a peak area in a region from 103 eV to 106 eV measured by deconvolution of the Si2p spectrum of the surface portion, wherein the Si2p spectrum is obtained through the XPS analysis.

3. The anode active material for a lithium secondary battery according to claim 1, wherein $O_C$ is calculated by Equation 3:

$$O_C = (G + 2H + 3I + 4J) / (5F + 4G + 3H + 2I + J) \qquad \text{[Equation 3]}$$

wherein, in Equation 3, F represents a peak area in a region from 98 eV to 100 eV measured by deconvolution of an Si2p spectrum of the core portion, G represents a peak area in a region from 100 eV to 101 eV measured by deconvolution of the Si2p spectrum of the core portion, H represents a peak area in a region from 101 eV to 102 eV measured by deconvolution of the Si2p spectrum of the core portion, I represents a peak area in a region from 102 eV to 103 eV measured by deconvolution of the Si2p spectrum of the core portion, and J represents a peak area in a region from 103 eV to 106 eV measured by deconvolution of the Si2p spectrum of the core portion, wherein the Si2p spectrum is obtained through the XPS analysis.

4. The anode active material for a lithium secondary battery according to claim 1, wherein a shortest distance from a surface of the silicon oxide particle to an outer surface of the core portion is 300 nm or more.

5. The anode active material for a lithium secondary battery according to claim 1, wherein $O_C$ is 0.8 or more.

6. The anode active material for a lithium secondary battery according to claim 1, wherein $O_C$ is in a range from 0.8 to 1.0.

7. The anode active material for a lithium secondary battery according to claim 1, wherein the silicon oxide particle includes $SiO_X$, wherein x is larger than 0 and equal to or smaller than 2.

8. The anode active material for a lithium secondary battery according to claim 1, wherein the silicon oxide particle is doped with a metal including at least one of Li, Mg, Al, Ca, Fe, Ti, or V.

9. A lithium secondary battery, comprising:

an anode comprising an anode active material; and a cathode facing the anode, wherein the anode active material comprises a silicon oxide particle that includes a core portion including silicon oxide occupying at least a center of the silicon oxide particle and a surface portion including silicon oxide formed on the core portion, wherein an oxidation number ratio of the silicon oxide particle defined by Equation 1 is 2.13 to 2.19, $$\text{Oxidation number ratio} = O_S / O_C \qquad \text{[Equation 1]}$$

wherein, in Equation 1, $O_S$ is an oxidation number of the silicon oxide of the surface portion obtained by an X-ray photoelectron spectroscopy (XPS) analysis, and $O_C$ is an oxidation number of the silicon oxide of the core portion obtained by the XPS analysis, and wherein the anode active material comprises a carbon coating formed on at least a portion of a surface of the silicon oxide particle.

10. The lithium secondary battery according to claim 9, wherein the anode further comprises a graphite-based active material.

11. The lithium secondary battery according to claim 10, wherein the graphite-based active material comprises at least one selected from the group consisting of artificial graphite and natural graphite.

12. The lithium secondary battery according to claim 9, wherein $O_S$ is calculated by Equation 2:

$$O_S = (B + 2C + 3D + 4E) / (5A + 4B + 3C + 2D + E) \quad \text{[Equation 2]}$$

wherein, in Equation 2, A represents a peak area in a region from 98 eV to 100 eV measured by deconvolution of an Si2p spectrum of the surface portion, B represents a peak area in a region from 100 eV to 101 eV measured by deconvolution of the Si2p spectrum of the surface portion, C represents a peak area in a region from 101 eV to 102 eV measured by deconvolution of the Si2p spectrum of the surface portion, D represents a peak area in a region from 102 eV to 103 eV measured by deconvolution of the Si2p spectrum, and E represents a peak area in a region from 103 eV to 106 eV measured by deconvolution of the Si2p spectrum of the surface portion, wherein the Si2p spectrum is obtained through the XPS analysis.

13. The lithium secondary battery according to claim 9, wherein $O_C$ is calculated by Equation 3:

$$O_C = (G + 2H + 3I + 4J) / (5F + 4G + 3H + 2I + J) \quad \text{[Equation 3]}$$

wherein, in Equation 3, F represents a peak area in a region from 98 eV to 100 eV measured by deconvolution of an Si2p spectrum of the core portion, G represents a peak area in a region from 100 eV to 101 eV measured by deconvolution of the Si2p spectrum of the core portion, H represents a peak area in a region from 101 eV to 102 eV measured by deconvolution of the Si2p spectrum of the core portion, I represents a peak area in a region from 102 eV to 103 eV measured by deconvolution of the Si2p spectrum of the core portion, and J represents a peak area in a region from 103 eV to 106 eV measured by deconvolution of the Si2p spectrum of the core portion, wherein the Si2p spectrum is obtained through the XPS analysis.

14. The lithium secondary battery according to claim 9, wherein a shortest distance from a surface of the silicon oxide particle to an outer surface of the core portion is 300 nm or more.

15. The lithium secondary battery according to claim 9, wherein $O_C$ is 0.8 or more.

16. The lithium secondary battery according to claim 9, wherein $O_C$ is in a range from 0.8 to 1.0.

17. The lithium secondary battery according to claim 9, wherein the silicon oxide particle includes $SiO_X$, wherein x is larger than 0 and equal to or smaller than 2.

18. The lithium secondary battery according to claim 9, wherein the silicon oxide particle is doped with a metal including at least one of Li, Mg, Al, Ca, Fe, Ti, or V.

* * * * *